United States Patent [19]

Bronder

[11] 4,279,075
[45] Jul. 21, 1981

[54] METHOD AND APPARATUS FOR MAKING A WIRE STYLUS BOARD

[75] Inventor: Joachim C. Bronder, Trumbull, Conn.

[73] Assignee: Burroughs Corporation, Detroit, Mich.

[21] Appl. No.: 75,589

[22] Filed: Sep. 14, 1979

[51] Int. Cl.³ .................. H01R 43/00; B23P 23/00
[52] U.S. Cl. ........................... 29/872; 29/33 F; 83/598; 83/599; 140/140; 228/170
[58] Field of Search .............. 30/304, 305; 83/650, 83/649, 598, 599, 332, 333; 140/140, 139; 19/0.6; 29/33 F, 872; 228/170

[56] References Cited
U.S. PATENT DOCUMENTS

| | | | |
|---|---|---|---|
| 41,459 | 2/1864 | Worden | 83/598 X |
| 3,194,101 | 7/1965 | Bush et al. | 83/650 X |
| 3,206,851 | 9/1965 | Smith | 30/304 |
| 3,776,084 | 12/1973 | Slyvakov | 19/0.6 X |

Primary Examiner—Nicholas P. Godici
Assistant Examiner—C. J. Arbes
Attorney, Agent, or Firm—Kevin R. Peterson; Robert A. Green

[57] ABSTRACT

The disclosure is of a grooved drum carrying an insulating strip, to which is secured a plurality of turns of an insulated wire wound helically on the drum. Inside the drum is mounted a longitudinal shaft which carries a series of spaced-apart cutting blades, and means are provided for moving the shaft by increments longitudinally to position the cutting blades behind different groups of wires. At each position, the knife assembly is rotated and the blades cut a group of spaced-apart wires which are joined together to provide a plurality of groups of wires.

11 Claims, 12 Drawing Figures

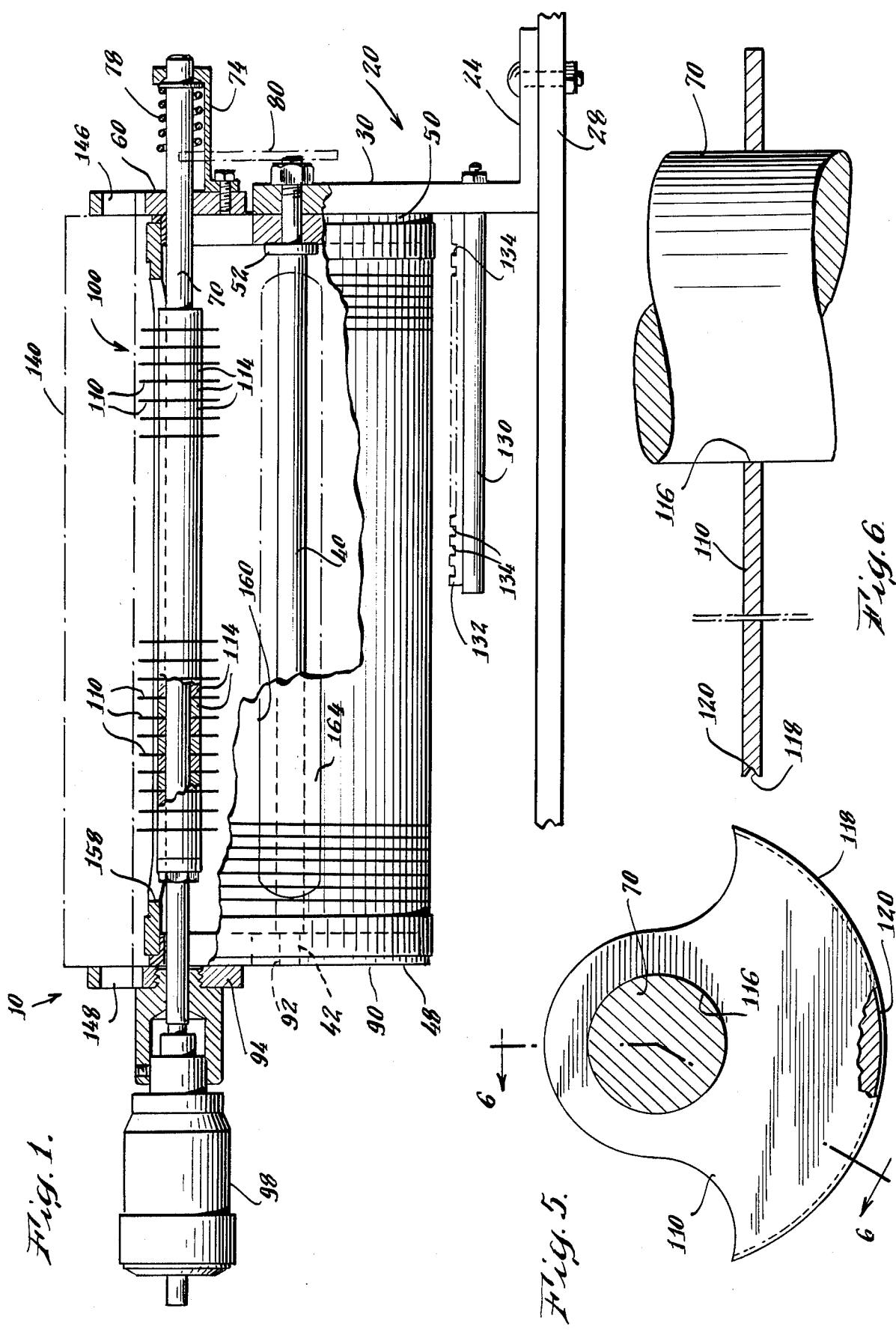

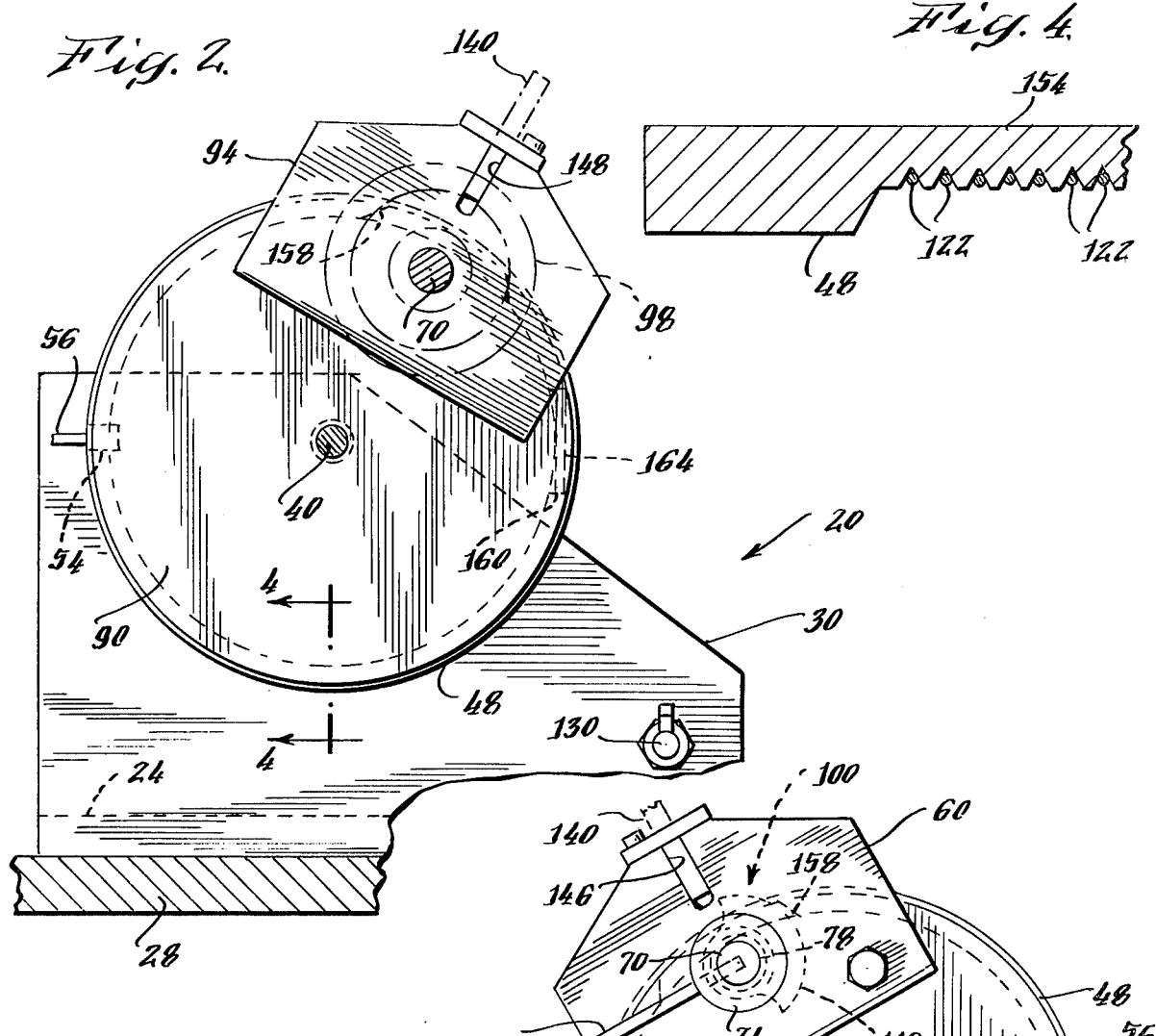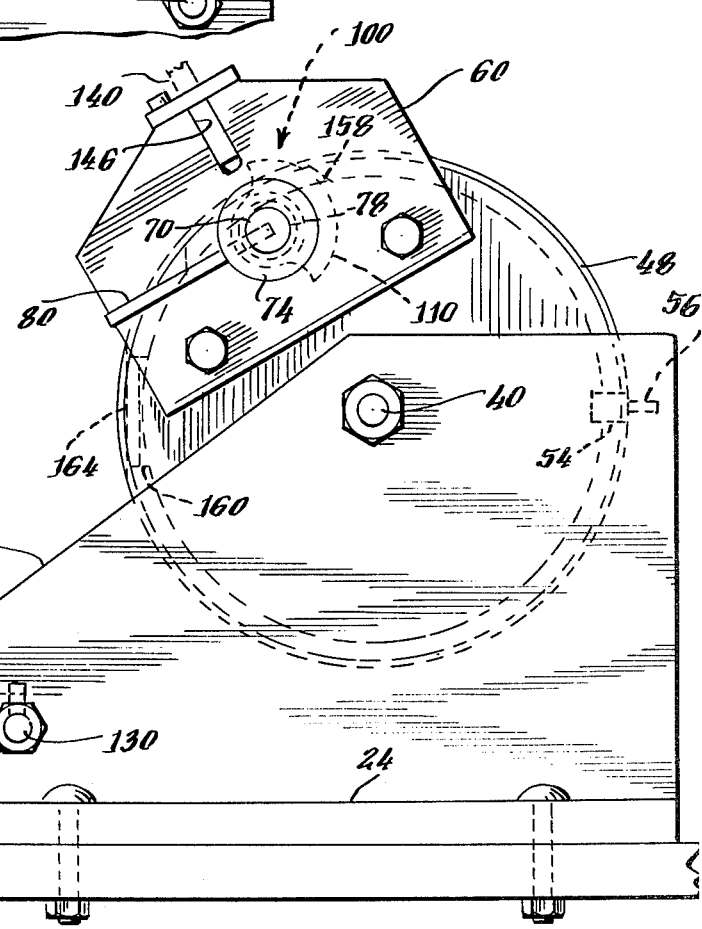

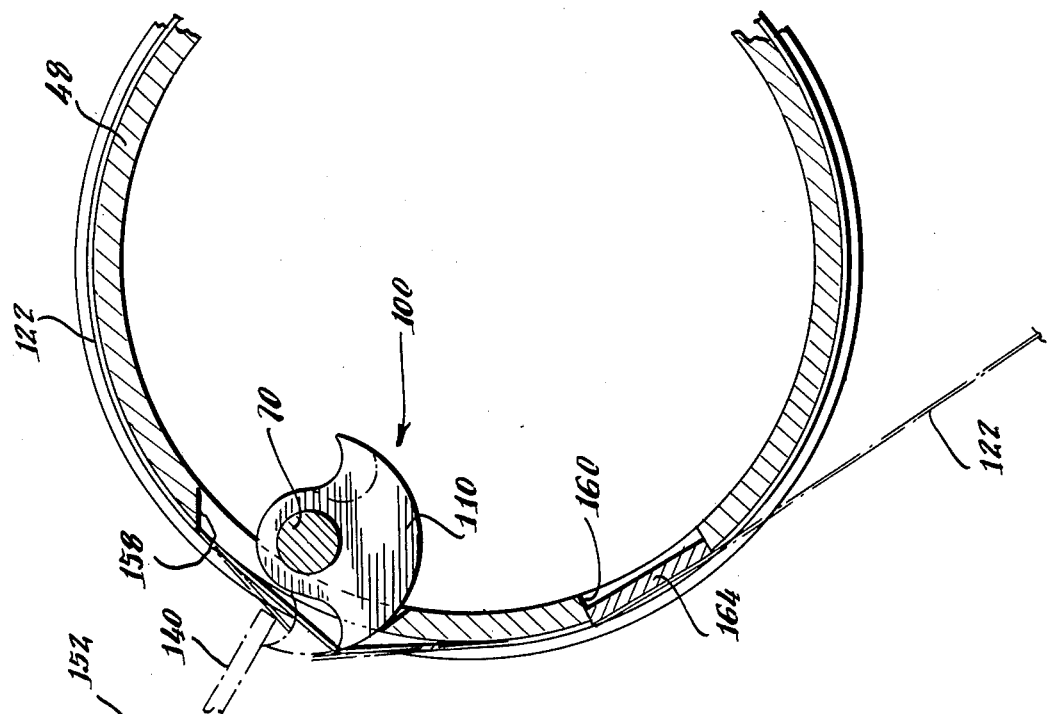
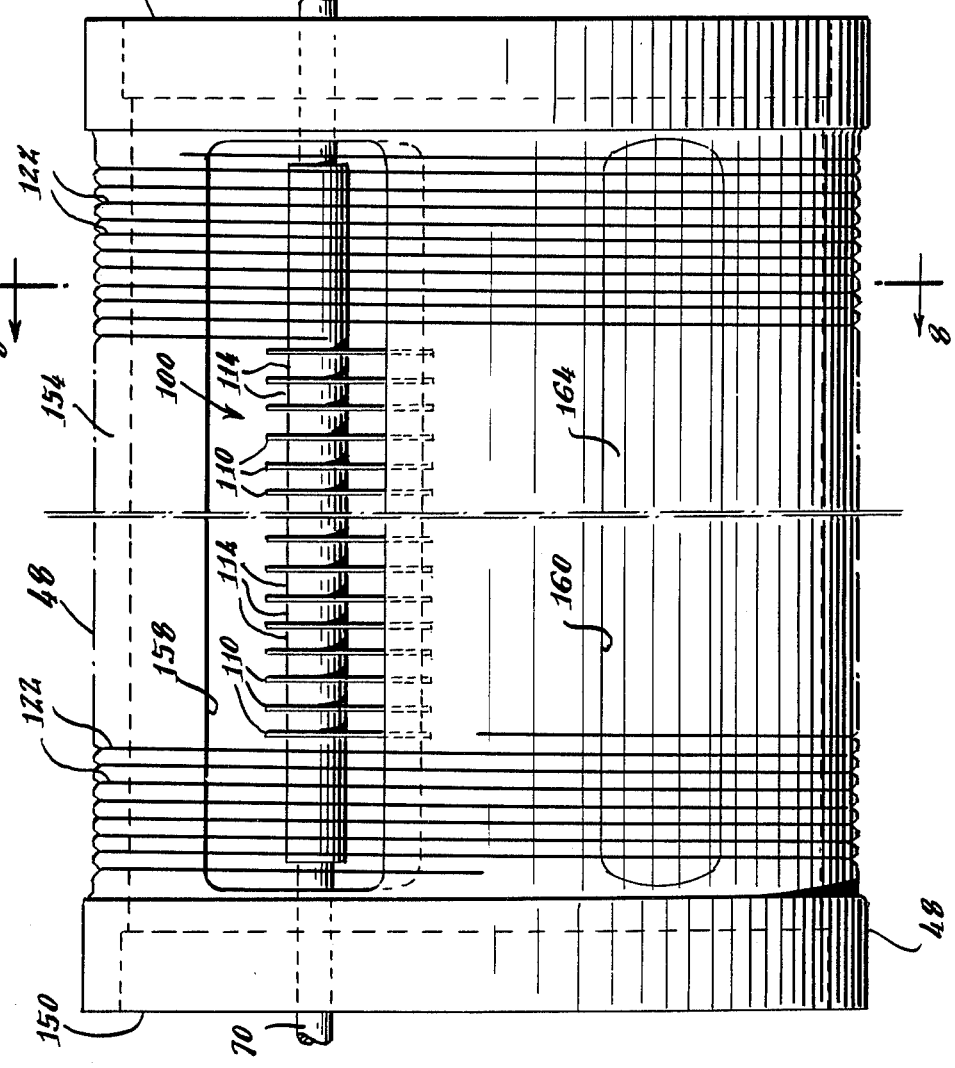

METHOD AND APPARATUS FOR MAKING A WIRE STYLUS BOARD

BACKGROUND OF THE INVENTION

One type of known facsimile machine uses a component known as a multi-stylus board. This board comprises an insulating sheet which carries a plurality of groups of wire-like styli formed on the sheet by a photo-etching process. In this process, a layer of metal is provided on the insulating sheet, and then it is selectively etched to provide fine, wire-like electrodes which are connected in groups so that one electrode in each group can be energized at the same time. The photo-etching process is an expensive operation, and the product produced is thus undesirably expensive.

SUMMARY OF THE INVENTION

The present invention solves this problem by forming the desired multi-stylus board with wires and by means of relatively simple apparatus and a simple assembly procedure.

DESCRIPTION OF THE DRAWINGS

FIG. 1 is a front elevational view of a portion of the apparatus of the invention;

FIG. 2 is a side elevational view of a portion of the lefthand end of the apparatus shown in FIG. 1;

FIG. 3 is a side elevational view of the righthand end of the apparatus of FIG. 1;

FIG. 4 is a front elevational view of a cutting blade used in the invention;

FIG. 5 is a side elevational view of the cutting edge of the blade of FIG. 4;

FIG. 7 is a front elevational view of a wire-wound drum used with the apparatus of FIG. 1;

FIG. 6 is a sectional view along the lines 6—6 in FIG. 5;

FIG. 8 is a view of a portion of the invention at one stage in its operation;

DESCRIPTION OF THE PREFERRED EMBODIMENTS

Figure 9:
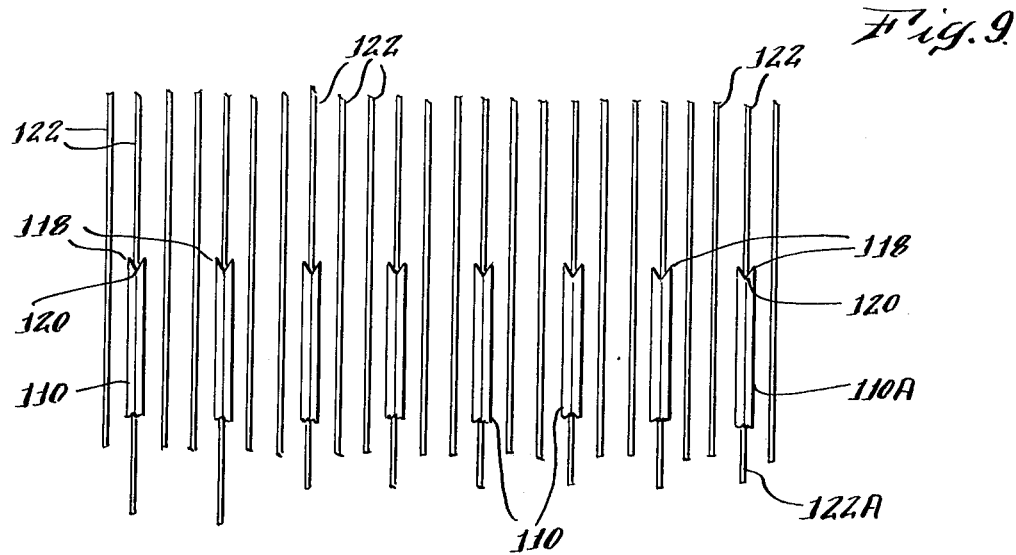
FIG. 9 is a front elevational view of a portion of the apparatus of FIG. 1, illustrating its operation.
Figure 10:
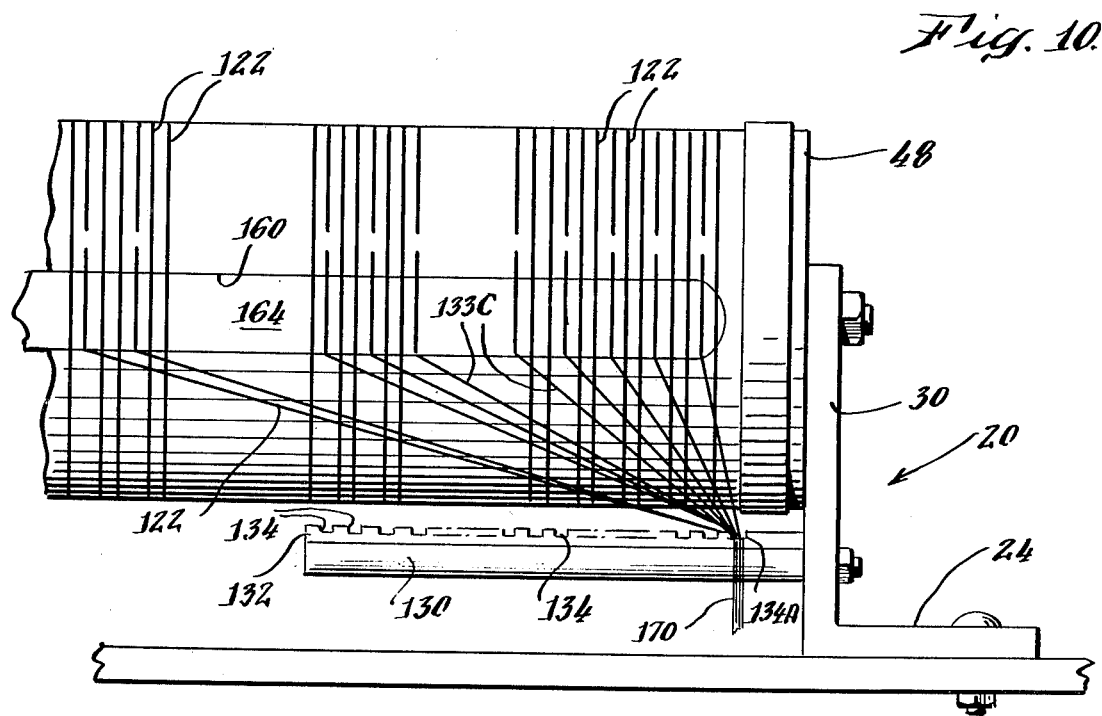
FIG. 10 is a front elevational view of a stylus assembly prepared by the apparatus of the invention at one stage in its preparation.

The apparatus of the invention 10 includes an L-shaped bracket 20 comprising a horizontal plate 24 secured to a support table 28 and a vertical plate 30 rising vertically therefrom. Bracker 20 carries various portions of the apparatus of the invention. A horizontal drum-support shaft 40 is secured at one end, the right end in FIG. 1, to the vertical plate 30, and the other end, the left end 42, is accessible so that a wire-support drum or cylinder 48 can be threaded on this shaft and can be suitably secured in place therein by other apparatus to be described.

A cylindrical right-hand disk 50 is secured to the inner surface of vertical plate 30 of bracket 20 and is held in place, for example, by a disk 52 on the shaft 40. A bracket 60 is secured to the outer surface of the disk 50 above the vertical plate 30 and tilted at an angle for a purpose to be described.

A second horizontal shaft 70, for supporting a cutting blade assembly, is rotatably secured to the disk 50, and bracket 60 and its right end is enclosed in a housing 74. The right-hand end of shaft 70 carries a helical spring 78 which biases the shaft to the left, as seen in FIG. 1. Other biasing means might also be used. This end of the shaft 70 also carries an operating handle 80, by means of which the shaft can be rotated to operate the cutting blades.

The apparatus 10 also includes a cylindrical left-hand disk 90, similar to disk 50, and having a central aperture 92, by which it can be secured to the left end 42 of the drum-support shaft 40. The disk 90 also carries, on its outer surface and above the central aperture 92, a bracket 94 which is similar to bracket 60. The bracket 94 and disk 90 carry a micrometer head 98 which is positioned to be coupled to the left end of the second shaft 70. The micrometer head is used to adjust the position of the shaft 70 and cutting blade assembly and to move them to the left or right as required. The spring-biasing means biases the shaft 70 against the micrometer head.

The cutting blade assembly 100 comprises a plurality of cutting blades 110 mounted on the shaft and accurately spaced apart by spacers 114. The blades 110 (FIGS. 5 and 6) are each in the form of a thin plate having an aperture 116, which receives the shaft 70, and a curved cutting edge 118. The cutting edge of each blade, or at least the leading, cutting portion thereof, is notched as at 120 to receive a wire 122 to be cut.

The apparatus 10 also includes a shaft 130 which is secured to the inner surface of right plate 50 and extends horizontally toward left plate 90. The shaft 130 carries an insulating strip 132 having notches 134 which are equal in number to the number of groups of wires to be formed.

A blade stop 140 in the form of an elongated, rigid, flat plate is seated in slots 146 and 148 in the upper edges of brackets 60 and 94 and extends therebetween, for a purpose to be described.

Referring now to drum or cylinder 48 (FIGS. 7 and 8), the surface of this member is provided with a thread-type groove whose pitch corresponds to the desired spacing of turns of a wire which is wound thereon as described below. The drum has left and right ends 150 and 152, and the cylindrical body 154 has two elongated slots 158 and 160 for a purpose to be described. The drum 48 has a diameter substantially equal to that of the disks 50 and 90 and carries suitable internal support members, by means of which it can be threaded on and positioned on shaft 40.

The wires 122 to be cut are carried on drum 48 which is provided with a thread-type helical groove along its length to receive the wires and properly space them. The wires comprise turns of an insulated wire which is helically wound on the drum to provide the desired number of turns of wire, and it is secured to a rigid strip 164 secured in slot 160 in the drum. The strip 164 extends along the length of the slot 160. The individual wire turns 122 are suitably secured to the strip 164 where they cross aperture 94, and the ends of the wire (not shown) are suitably secured to the ends of the drum. The drum is threaded on shaft 40, and disk 90 is secured to shaft 42, and this holds the drum securely between the disks 50 and 90. The strip 164 may be of insulating material or of metal, as desired. In one embodiment of the invention, strip 164 is of fiberglass.

In operation of the invention, the drum 48, carrying the wire turns 122, is threaded on and secured in place on shaft 40 with its ends in contact with disks 50 and 90. The ends of the drum body are provided with notches 54 which engage pins 56 on end disks 50 and 90 to provide a positional control of the drum. The blade stop 140 is seated in the slots in the brackets 60 and 94, with its lower edge extending along the drum over slot 158 and close to the wires to act as a stop for the cutting blades, as will be seen below.

The micrometer head 98 is manipulated to move the shaft 70 and the blade assembly 100 to the rightmost position against the sprimg 78, and it is positioned so that the first or rightmost blade 110A is in cutting position behind the first or rightmost wire turn 122A. This places the other blades 110 in cutting alignment with all of the other wires which are to be cut at the same time to form a group of wires. With the cutting blades thus properly positioned to cut the first wire and the other proper wires spaced therefrom, the handle 80 is rotated to rotate shaft 70, and the blades 100 are rotated to bear against and cut or break the wire turns. The blades meet stop 140 at the end of their path of rotation as indicated by the dash lines in FIG. 8.

The operator pulls these cut wires 122 out and away from the surface of the drum (dash lines in FIG. 8) and brings them down and together and places them in the first notch 134A and solders the cut wire ends together to form a contact terminal 170. The other ends of these wires are secured to strip 164, as noted above. The micrometer head is then rotated to move shaft 70 and blades 110 to the left to the next cutting position, and the next group of wires are cut, grouped in the next notch 134, and soldered together. This operation is repeated until all of the wires have been cut and grouped.

Figure 11:
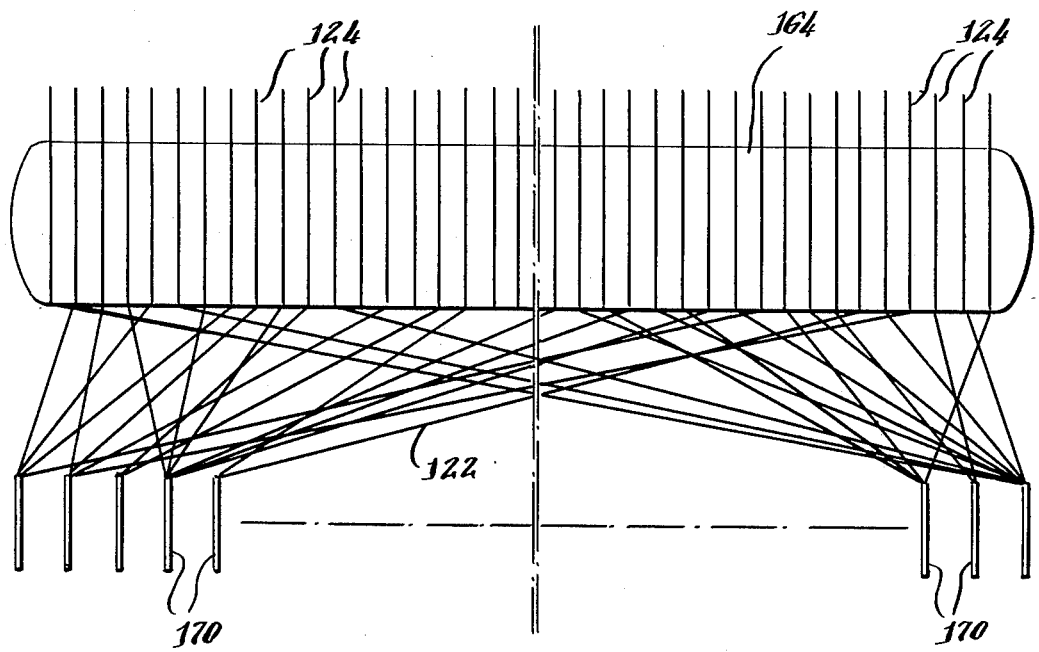
FIG. 11 is a front elevational view of the apparatus of FIG. 10 in its completed form and FIG. 12 shows the apparatus of FIG. 11 with loose wires cut to provide the final stylus board.
Figure 12:
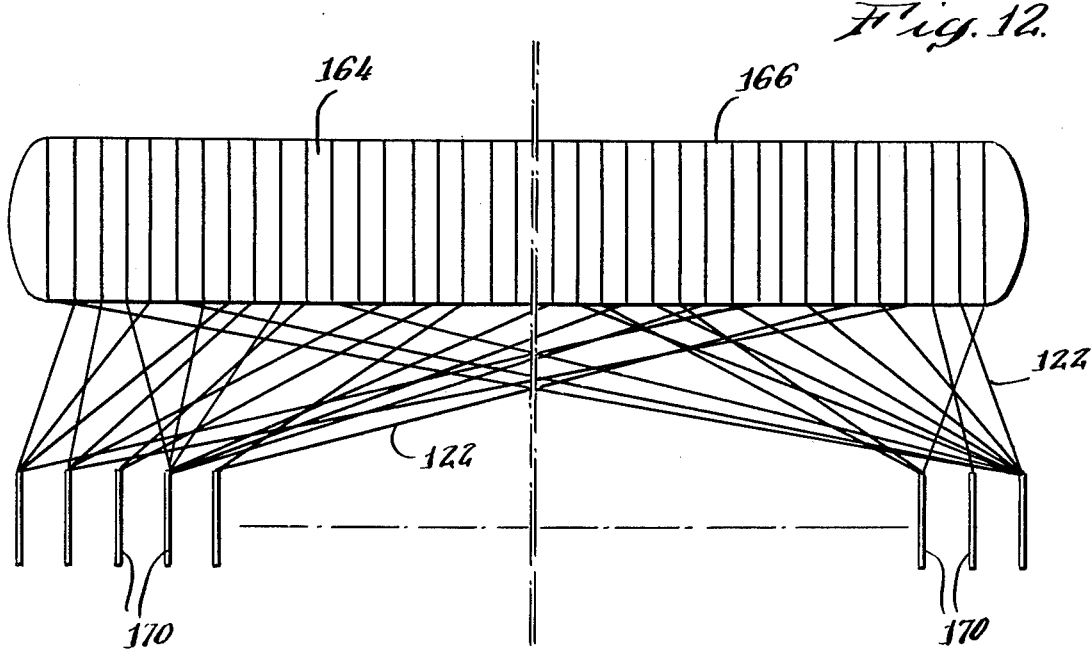

After all of the wires have been cut and grouped, the strip 164, to which the wires are secured, is removed from the slot 160 in the drum. Referring to FIG. 11, the short wire portions 124, which extend vertically from the strip 164 to where the wires were cut, are removed and the edge 166 of the strip 164 is trued up to provide a flat level surface. The ends 123 of the individual wires 122 are available at this flat surface to operate as styli in an apparatus for electrostatically charging a sheet of paper.

In one type of facsimile machine, two strips 164 are employed, with the paper-charging wire ends 123 offset laterally to provide a staggered arrangement from one strip to the other.

What is claimed is:

1. The method of making a wire stylus board comprising
   winding a number of turns of a wire on a drum,
   securing a portion of each wire to a support strip on said drum,
   cutting groups of said wires simultaneously,
   removing the cut wires from the surface of the drum, and
   connecting their ends together to form a single terminal whereby electrical signals can be connected to all of said cut wires at the same time.

2. The method of making a wire stylus board comprising
   winding a number of turns of a wire on a drum having first and second elongated apertures therein,
   securing a portion of each wire to a support strip removably mounted in said first elongated aperture,
   cutting groups of said wires simultaneously by means of a plurality of cutting blades disposed inside said drum and projecting through said second aperture when performing a cutting operation,
   removing the cut wires from the surface of the drum, and
   connecting them together at their ends whereby electrical signals can be connected to all of said cut wires at the same time.

3. The method of making a wire stylus board comprising
   winding a number of turns of a wire on a drum having first and second elongated apertures therein, said apertures being parallel to each other with the first aperture being located above the second aperture,
   securing a portion of each wire to a support strip seated in one of said elongated apertures,
   cutting groups of said wires simultaneously by means of a plurality of cutting blades disposed inside said drum and aligned with the other of said elongated apertures, the blades extending through said other aperture when performing a cutting operation,
   removing the cut wires from the surface of the drum, and
   connecting them together at their ends whereby electrical signals can be connected to all of said cut wires at the same time.

4. The method of making a wire stylus board comprising
   winding a number of turns of a wire on a drum having first and second elongated apertures therein, said apertures being parallel to each other,
   securing a portion of each wire to a support strip seated in said second elongated aperture,
   cutting groups of said wires simultaneously by means of a pluarlity of cutting blades disposed inside said drum and aligned with said first elongated aperture, the blades extending through said first aperture when performing a cutting operation,
   removing the cut wires from the surface of the drum, and
   connecting them together at their ends whereby electrical signals can be connected to all of said cut wires at the same time.

5. The method of making a wire stylus board comprising
   winding a number of turns of a wire on a drum having first and second elongated apertures therein, said apertures being parallel to each other with the first aperture being located above the second aperture,
   securing a portion of each wire to a support strip seated in said second elongated aperture,
   providing an assembly of a plurality of cutting blades,
   positioning said assembly of cutting blades at a first position and cutting a first group of wires,
   removing the cut wires from the surface of the drum,
   connecting together the first cut wires at their ends whereby electrical signals can be connected to all of said first cut wires at the same time,
   positioning said assembly of cutting blades at a second position and cutting a second group of wires, and
   connecting together the second cut wires at their ends whereby electrical signals can be connected to all of said second wires at the same time.

6. Apparatus for forming a wire stylus board comprising
a drum carrying a wire wound thereon to provide a plurality of turns of the wire,
a cutting blade assembly disposed within said drum and carrying a plurality of spaced-apart cutting blades, and
means coupled to said cutting blade assembly for positioning said cutting blade assembly in cutting relationship with different groups of said wires.

7. The apparatus defined in claim 6 and including means for holding each group of cut wires for processing to form a single terminal thereon.

8. The apparatus defined in claim 6 wherein the wire carries an insulating coating.

9. The apparatus defined in claim 6 wherein said drum includes first and second elongated slots, the first for removably receiving a support strip to which all of the turns of said wire are secured, and the second for receiving the blades of said cutting assembly as they cut the turns of said wire.

10. The apparatus defined in claim 6 and including a blade stop extending across said drum adjacent to said second aperture.

11. The apparatus defined in claim 6 wherein said cutting blade assembly includes a rotatable shaft carrying said cutting blades and means for moving said shaft axially adjacent to said drum by controlled amounts whereby said cutting blades can be brought into cutting alignment with different groups of wire turns.

* * * * *